United States Patent [19]

Stiepel et al.

[11] Patent Number: 5,223,872

[45] Date of Patent: Jun. 29, 1993

[54] SURVEILLANCE DEVICE WITH EYEBALL ASSEMBLY AND PIVOTABLY MOUNTABLE CARRIAGE ASSEMBLY

[75] Inventors: Norbert M. Stiepel, Coral Springs; Luis Anderson, Boca Raton; Steve Uhl, Ft. Lauderdale; James W. Miller, Lauderhill; Michael Smith, Margate, all of Fla.

[73] Assignee: Sensormatic Electronics Corporation, Deerfield Beach, Fla.

[21] Appl. No.: 803,085

[22] Filed: Dec. 4, 1991

Related U.S. Application Data

[63] Continuation-in-part of Ser. No. 761,331, Sep. 17, 1991.

[51] Int. Cl.⁵ .......................................... G03B 29/00
[52] U.S. Cl. ...................................... 354/81; 358/108
[58] Field of Search ........................... 354/81; 358/108

[56] References Cited

U.S. PATENT DOCUMENTS

| | | | |
|---|---|---|---|
| 894,348 | 7/1908 | Seele . | |
| 1,641,301 | 9/1927 | Sperry . | |
| 3,535,442 | 10/1970 | Jennings | 178/15 |
| 3,720,147 | 3/1973 | Bemis | 354/81 |
| 3,732,368 | 5/1973 | Mahlab | 178/15 |
| 3,739,703 | 6/1973 | Behles | 354/81 |
| 3,819,856 | 6/1974 | Pearl et al. | 178/15 |
| 3,916,097 | 10/1975 | Imai | 178/15 |
| 3,935,380 | 1/1976 | Coutta | 178/15 |
| 4,080,629 | 3/1978 | Hammond et al. | 358/229 |
| 4,120,004 | 10/1978 | Coutta | 358/108 |
| 4,160,999 | 7/1979 | Claggett | 358/108 |
| 4,225,881 | 9/1980 | Tovi | 358/108 |
| 4,320,949 | 3/1982 | Pagano | 354/81 |
| 4,510,526 | 4/1985 | Coutta et al. | 358/108 |
| 4,736,218 | 4/1988 | Kutman | 354/81 |
| 4,833,534 | 5/1989 | Paff et al. | 358/108 |
| 4,855,823 | 8/1989 | Struhs et al. | 358/108 |
| 4,901,146 | 2/1990 | Struhs et al. | 358/108 |
| 4,918,473 | 4/1990 | Blackshear | 354/81 |
| 4,945,367 | 7/1990 | Blackshear | 354/81 |

Primary Examiner—David M. Gray
Attorney, Agent, or Firm—Robin, Blecker, Daley & Driscoll

[57] ABSTRACT

A surveillance assembly in which a camera and lens assembly is surrounded by a shroud to form an eyeball assembly which is rotatable about first and second axes and which is enclosed within a housing. A carriage assembly for mounting the eyeball assembly to the housing is provided in the surveillance assembly and includes pivot and engagement parts which allow the carriage assembly to be pivoted into position. Additionally disclosed is a camera/lens mounting with a resilient annular member for permitting adjustment of the mounting along the lens axis and a cable support assembly for an electrical cable connected between a camera lens assembly and another part of a surveillance assembly in which the cable support assembly permits the cable to be wound about the pivot axis of the camera and lens assembly. Further disclosed is the use of a spherical shroud and a circular aperture in the shroud for viewing outward of the shroud and the further use of a lens member occupying the area of the circular aperture and having in the area of the aperture an outer spherical surface which follows the spherical surface of the shroud so as to complete the surface.

13 Claims, 15 Drawing Sheets

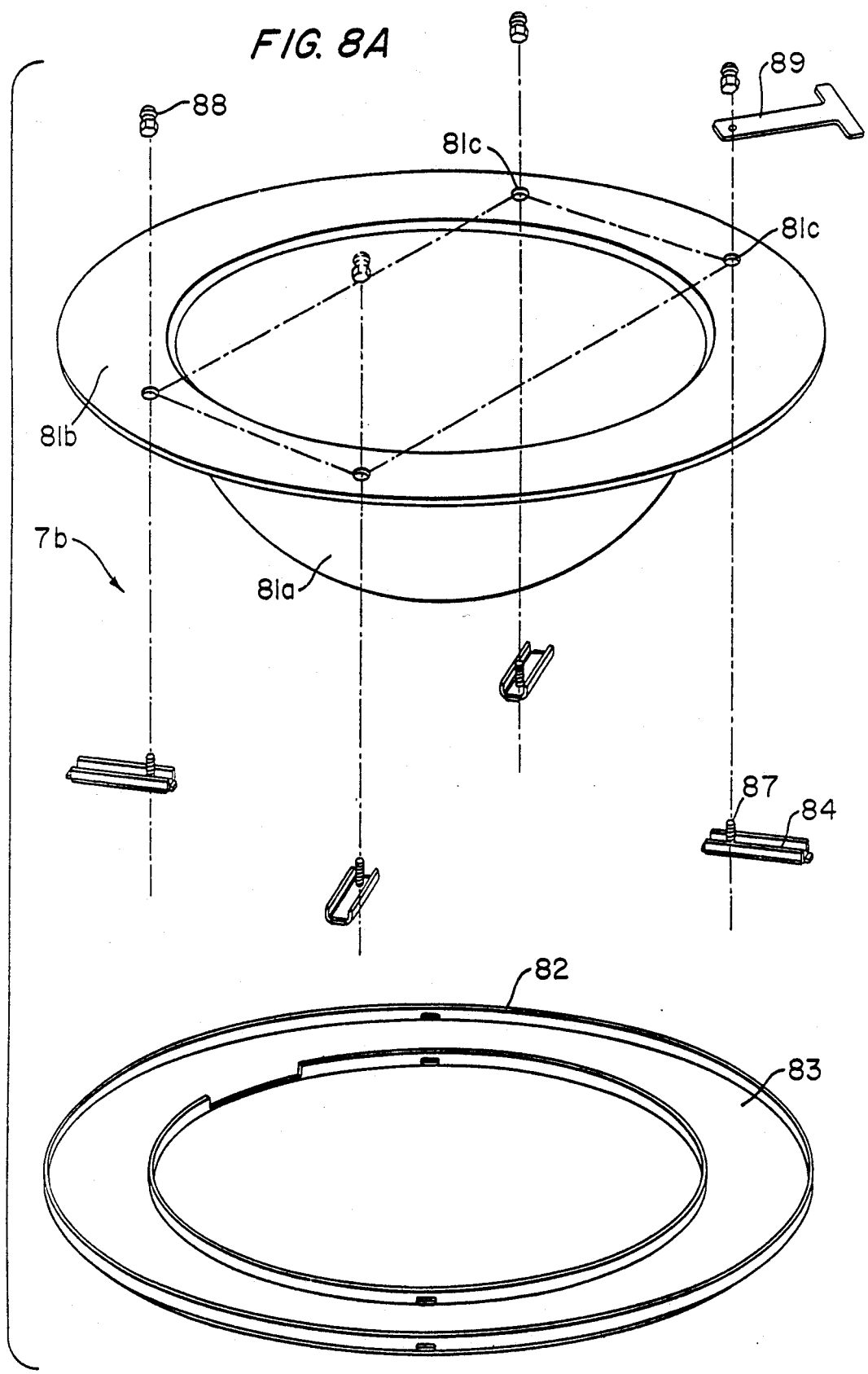

SURVEILLANCE DEVICE WITH EYEBALL ASSEMBLY AND PIVOTABLY MOUNTABLE CARRIAGE ASSEMBLY

This application is a continuation-in-part of U.S. patent application Ser. No. 761,331, filed Sep. 17, 1991, and assigned to the same assignee hereof.

BACKGROUND OF THE INVENTION

This invention relates to a surveillance device and, in particular, to a surveillance device which employs a camera and lens assembly.

A type of surveillance device is known in the art in which a camera and lens assembly is utilized in the surveillance device to permit the device to view the location being placed under surveillance. The surveillance device is provided with a housing for housing the camera and lens assembly. A typical housing includes an upper support section which may be dome-shaped and from which the camera and lens assembly is suspended. A lower section, which may also be domed-shaped, abuts the upper section to complete the housing and fully enclose the camera and lens assembly. The lower section is also light transmissive to permit viewing by the camera and lens assembly outward of the housing.

In the above-type of surveillance device, the lens and camera assembly is carried by a mounting member which is coupled to the support section of the housing so as to be rotational about a first axis, usually a vertical axis. The lens and camera assembly is furthermore supported on the mounting member such that the assembly itself is rotatable about a second axis, usually a horizontal axis. In this way, by rotation of the mounting member and rotation of the camera and lens assembly, the latter can be moved in a horizontal plane and a vertical plane, respectively, to provide the so-called "panning" and "tilting" motion of the assembly. This, in turn, provides the desired viewing coverage of the location under surveillance.

Also employed in some surveillance devices of this type is an opaque or non-light-transmissive enclosure or shroud. This shroud is affixed to and rotates with the mounting member and extends between the lower housing section and the camera and lens assembly. The shroud thus shields the camera and lens assembly, making the assembly difficult to observe through the light-transmissive housing section. This prevents a subject under surveillance from readily removing himself or herself from the camera field of view.

The above use of a shroud in a surveillance device requires that the shroud be provided with an elongated, vertical slot. This slot permits the camera and lens assembly to view outward of the shroud over the extent of the tilting motion of the assembly. However, the presence of the slot also permits viewing of the camera and lens assembly through the slot from certain viewing angles. This detracts from the desired shielding function of the shroud.

In U.S. Pat. No. 4,833,534, assigned to the same assignee hereof, an additional non-light-transmissive shutter is provided in the surveillance device to mitigate against the undesired effects of the slot. This shutter is arranged to move with the tilting motion of the camera and lens assembly so as to fill or occupy the region of the slot not blocked by the assembly itself. While the presence of the shutter substantially prevents viewing of the camera and lens assembly through the slot, it also requires the use of an additional moving part and the coordinating of the movement of this part with the tilting movement of the camera and lens assembly.

In the above-type surveillance device, it has also been customary to bolt the mounting member carrying the camera and lens assembly to the upper support section of the housing. This has made installation and servicing of the camera and lens assembly time consuming and difficult, particularly in overhead or ceiling installations. Accordingly, designs are being sought for the mounting member which enable the member to be installed and removed more quickly and with less effort. One such design is disclosed in U.S. Pat. No. 4,945,367, in which the mounting member is provided with slots which are received by depending pins situated in the support section of the housing. By twisting the mounting member, the slots become locked to the pins so that the desired connection of the mounting member to the support housing is realized.

The above arrangement of the '367 patent, however, still requires alignment of several slots in the mounting member with corresponding pins in the support housing. This alignment procedure can be a difficult process, particularly when the weight of the camera and lens assembly is considered and the installation is overhead.

In the above-type surveillance devices, the camera and lens assembly usually comprises a camera/lens mounting for coupling the lens of the assembly to the camera image pick-up unit of the assembly. The image pick-up unit may or may not have attached to it the remainder of the camera body, depending upon certain length requirements of the surveillance device.

In a typical camera/lens mounting, the mounting is adapted to engage a cylindrical collar at the back end of the lens. This collar has an annular slot which receives a first wider cylindrical end of a shouldered member, referred to as a "C-mount", which forms a part of the camera/lens mounting. A narrower second cylindrical end of the shouldered C-mount is then adapted via a threaded section to receive the threaded front end of the image pick-up unit.

In order to hold the C-mount in place, the camera/lens mounting is further provided with a locking ring or nut. This nut has an inner surface which bears against the shoulder of the C-mount as the ring is locked to the collar via internal threads which mate with external threads on the collar.

In the above camera and lens assembly, once the pick-up unit is locked to the lens via the camera/lens mounting, it may be necessary to adjust the position of the image pickup relative to focal point of the lens. This is presently accomplished by an adjusting mechanism included in the image pick-up unit which allows preselected movement of the components of the unit. This adjusting mechanism is often of complicated mechanical design and, therefore, other techniques for making this so-called "backfocus" adjustment are being sought.

It is, therefore, an object of the present invention to provide a surveillance device in which the security of the device is better preserved.

It is a further object of the present invention to provide a surveillance device in which enhanced shielding of the camera and lens assembly of the surveillance device is realized.

It is also an object of the present invention to provide a surveillance device in which the installation and removal of the camera and lens assembly is made easier and quicker.

It is yet a further object of the present invention to provide a camera/lens mounting for the camera and lens assembly of a surveillance device which allows for easier adjustment of the camera image pick-up unit relative to the lens of the assembly.

SUMMARY OF THE INVENTION

In accordance With the principles of the present invention, the above and other objectives are realized in part in a surveillance device of the above-type in which a shroud is provided in the surveillance device and is arranged to substantially totally surround and move with the camera and lens assembly. The shroud is itself provided with a light-transmissive area aligned with the viewing direction of the camera and lens assembly and of sufficient extent to pass the viewing cone of the assembly. The shroud thus forms with the camera and lens assembly an eyeball assembly.

The eyeball assembly is adapted to itself be mounted within the housing of the surveillance device such as to allow rotational movement of the eyeball assembly about first and second axes. This enables panning and tilting of the eyeball assembly and, therefore, the viewing axis of the camera and lens assembly.

With this configuration for the surveillance device, the camera and lens assembly is totally shielded or blocked from view by the shroud of the eyeball assembly, making it extremely difficult to detect the direction in which the lens assembly is viewing. Also, since the shroud and camera and lens assembly move together as the eyeball assembly, the need to coordinate additional movable parts to effect shielding is avoided.

In the embodiment of the invention to be disclosed hereinafter, the eyeball assembly is provided with a mounting member which is within the shroud and to which the camera and lens assembly and the shroud are mounted. The mounting member is adapted to be rotational about the first and second axes so as to provide this rotational movement to the eyeball assembly.

A carriage assembly is also provided for connecting the eyeball assembly to the support section of the surveillance device housing. The carriage assembly includes a support means which is rotational about the first axis and which engages the mounting member of the eyeball assembly through a coupling means. The coupling means permits the mounting member to be rotational about the second axis relative to the support means while it causes the mounting member to rotate about the first axis with the support means. The support means is in the form of a yoke having spaced arms which engage individual couplings of the coupling means attached to opposing parts of the mounting member.

In a further aspect of the invention, the carriage assembly of the surveillance device is provided with a pivot means adapted to pivotably engage a first surface area of the support section of the surveillance device housing. The carriage assembly is also provided with an engagement means adapted to engage a second surface area of the housing as the carriage assembly is pivoted via the pivot means relative to the first surface area. In this way, the carriage assembly is brought into supporting engagement with the first and second surface areas of the housing support section so that the carriage assembly and the carried eyeball assembly become supported thereby.

In the disclosed embodiment, the pivot means and engagement means comprise respective first and second elongated members arranged along opposing sides of the carriage assembly. These members are provided with ends adapted to seat in respective slotted seating regions defining the first and second surface areas of the housing support section. Additionally, these members are adapted such that their respective ends can be moved toward and away from each other. As a result, the ends of each member can be moved toward each other during alignment with their respective slotted seating regions and then moved away from each other to seat them in these regions.

Adapting the elongated members to provide this movement is through a biasing means which urges or forces the ends of a member apart. A further means is then provided for reducing the bias provided by the biasing means so the ends of a member can be brought together.

In yet a further aspect of the invention, a camera/lens mounting for the camera and lens assembly is provided. This mounting includes a shouldered tubular member, a locking and adjusting ring and an annular resilient means in the form of an undulating or wavy annular member or washer. The resilient means is situated in the slot of the lens collar between the lens and the shouldered member and allows for positive, but adjustable, locking of the shouldered member to the lens when the locking ring is attached to the collar. The shouldered member can thus be moved controllably axially permitting adjustment of the member and the attached image pick-up relative to the lens focal point.

In still yet a further aspect of the invention, the electrical cable connecting the camera and lens assembly to the carriage assembly is wound about the second axis to promote compactness and avoid entanglement.

In still a further aspect of the invention, the shroud of the eyeball assembly is made spherical and the light-transmissive area of the shroud comprises a circular aperture in the shroud. Additionally, the eyeball is provided with a lens member which is situated in the shroud so as to occupy the circular aperture. The lens member is configured to have an outer spherical surface which follows and completes the outer spherical surface of the shroud. In this way, the shroud in the area of the light-transmissive circular aperture maintains its spherical appearance.

BRIEF DESCRIPTION OF THE DRAWINGS

The above and other features and aspects of the present invention will become more apparent upon reading the following detailed description in conjunction with the accompanying drawings, in which:

FIGS. 8A and 8B show various views of the housing cover section of the housing of the surveillance device of FIG. 1;

DETAILED DESCRIPTION

Figure 1:
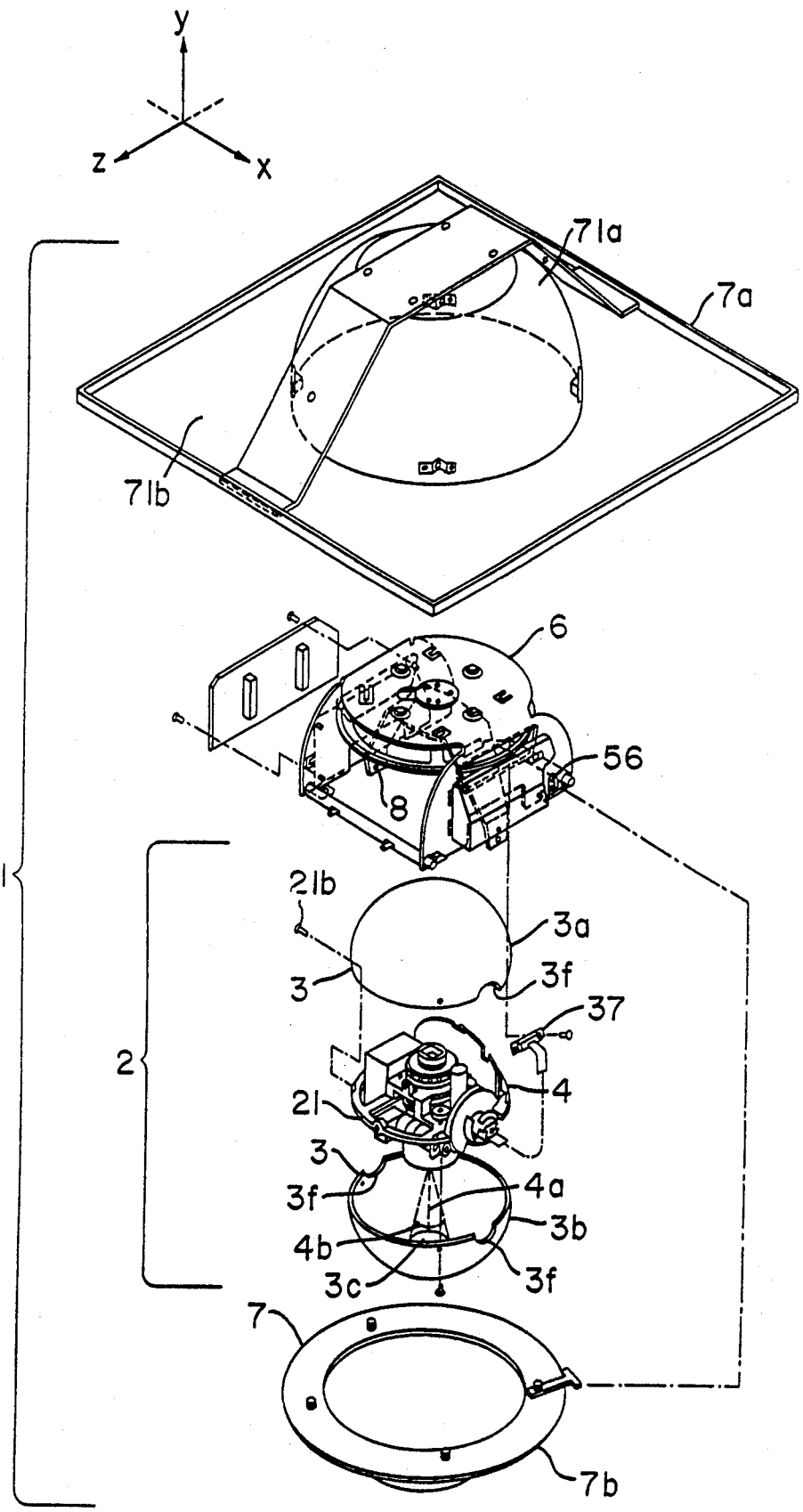
FIG. 1 shows an exploded view of a surveillance device in accordance with the principles of the present invention.

FIG. 1 shows a surveillance device 1 in accordance with the principles of the present invention. The device 1 comprises an eyeball assembly 2, a carriage assembly 6 for carrying the eyeball assembly 2 and a housing 7 for supporting and enclosing the eyeball and carriage assemblies.

The eyeball assembly 2 is itself formed from a shroud 3 and a lens and camera assembly 4. The shroud 3 comprises abutting non-light-transmissive hemispherical shells 3a and 3b which together form a hollow sphere which substantially totally surrounds the lens and camera assembly 4. The shells 3a and 3b are held in abutting relationship by connecting the shells, via screws 21b, to the periphery of a mounting member 21 of the camera and lens assembly 4.

To permit the camera and lens assembly 4 to view outward of the spherical shroud 3, the shell 3b is provided with a light-transmissive view aperture 3c. The latter aperture aligns with the viewing axis 4a and is just sufficient to pass the viewing cone 4b of the camera and lens assembly. The assembly 4 can thus view outward of the shroud 3, while otherwise being totally shielded by the shroud.

The shielding effect of the shroud 3 can be further enhanced by suitably adapting the outer surfaces of the shells 3a and 3b to make them less observable. Preferably, these surfaces may be made reflective to light in the same manner as the glass surface of the objective lens 4c of the camera and lens assembly 4. This can be accomplished by painting the surfaces with a material which simulates the reflectivity of the lens glass. Alternatively, the outer surfaces of the shells, instead of being made reflective, can be made non-reflective by making them opaque or black.

The carriage assembly 6 carries the eyeball assembly 2 such that the entire eyeball assembly is able to rotate about first and second orthogonal axes, shown as the y-axis and x-axis, respectively, in FIG. 1. The carriage assembly 6, in turn, is fixedly mounted to a top or housing support section 7a of the housing 7. When the carriage assembly is so mounted, the eyeball assembly 2 extends into a housing cover section 7b of the housing. The section 7b abuts the top housing section 7a so as to totally enclose the carriage and eyeball assemblies. The bottom section 7b is further made of a light-transmissive material, typically a clear acrylic, so as to permit the eyeball assembly to view out of the housing 7.

As above-indicated, the entire eyeball assembly is adapted to rotate about the x-axis and the y-axis, i.e., to undergo pivoting and panning motion, to bring the viewing axis 4a and viewing cone 4b of the camera and lens assembly 4 to various positions. As can be appreciated, during this pivoting and panning motion, the presence of the shroud 3 substantially eliminates the ability to observe the direction in which the camera and lens assembly 4 is pointing. Accordingly, avoiding the view of the camera is made more difficult.

Figure 2:
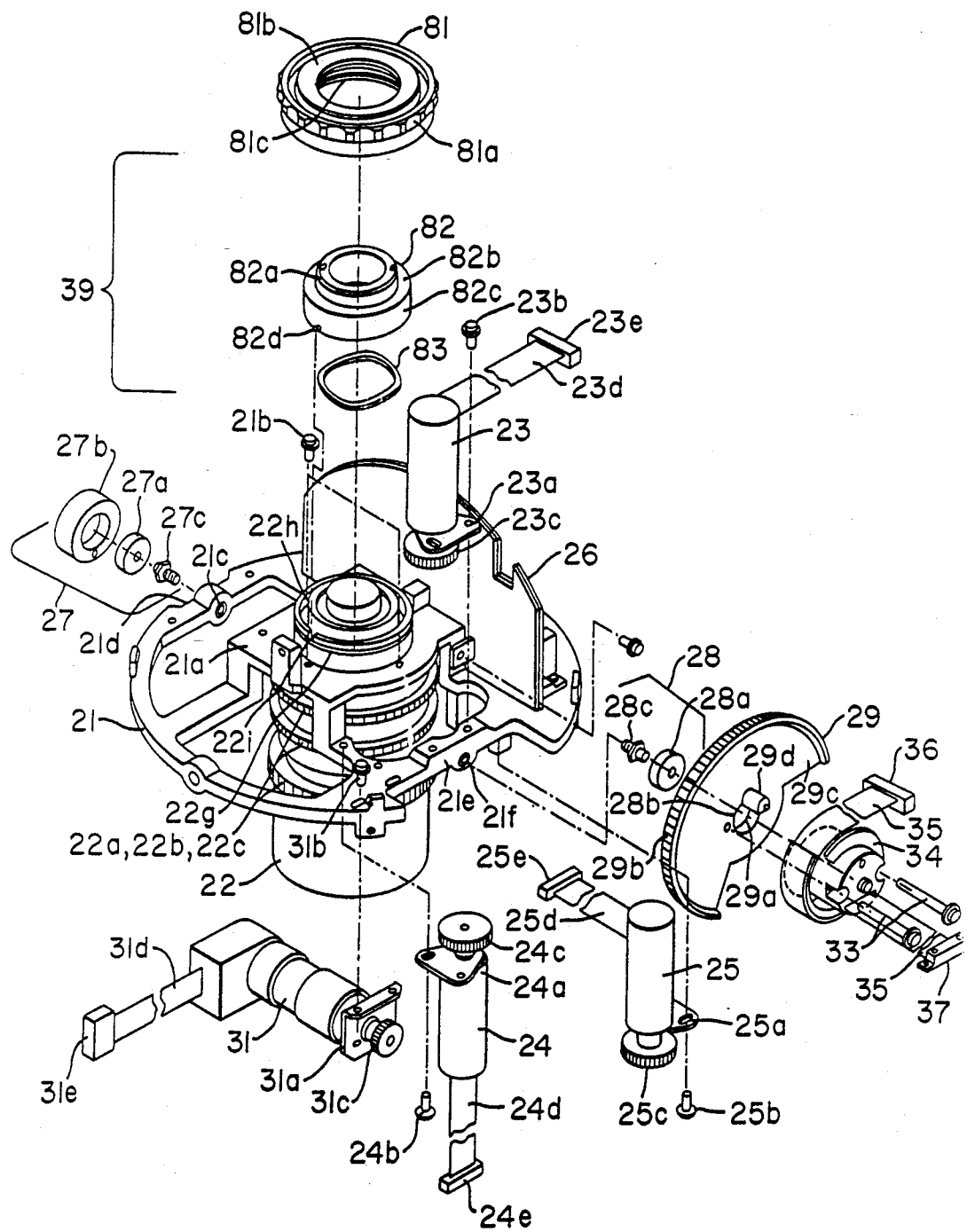
FIG. 2 shows a partially exploded view of the camera and lens assembly of the eyeball assembly of the surveillance device of FIG. 1.
Figure 3:
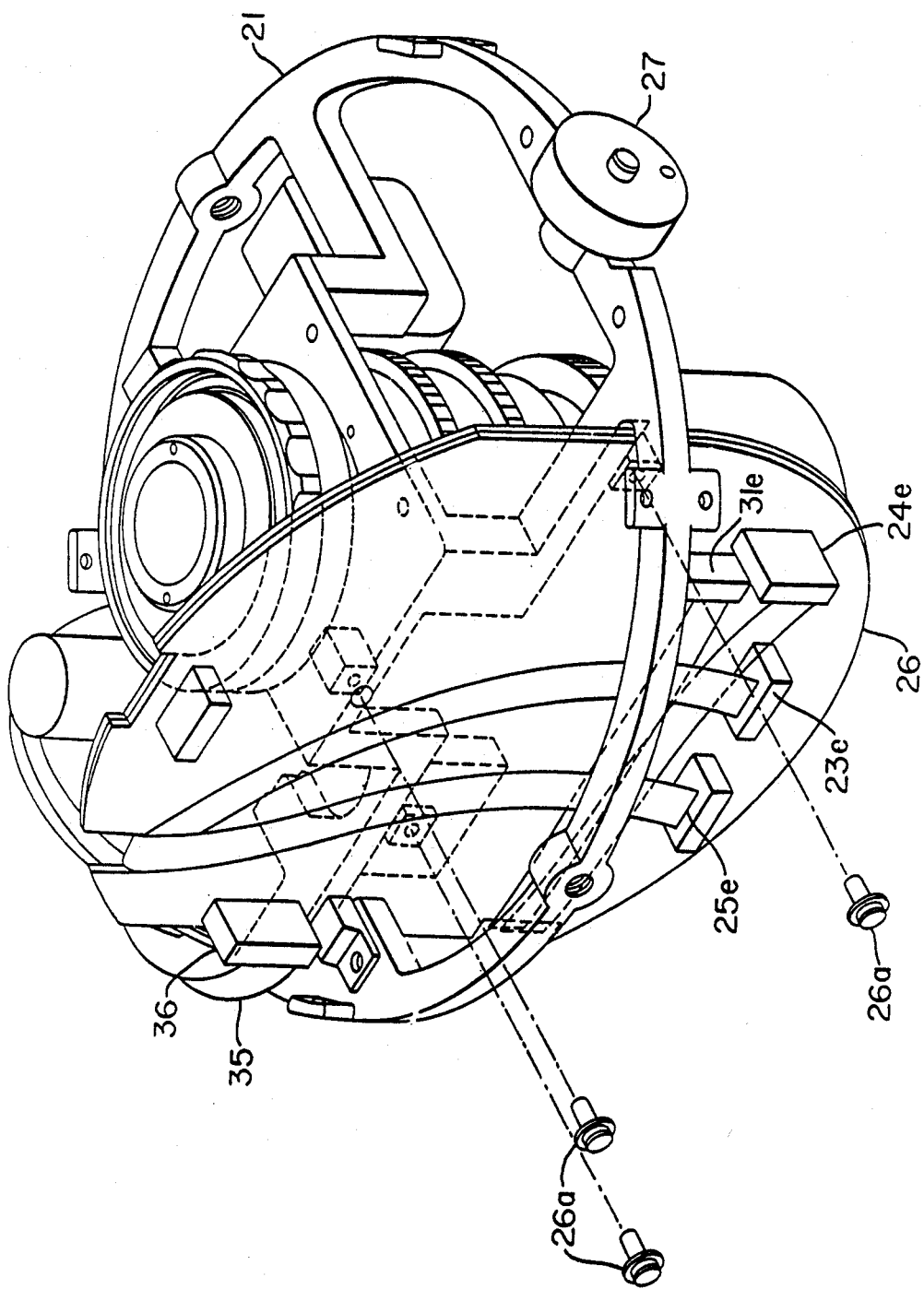
FIG. 3 shows an assembled view of the camera and lens assembly of the eyeball assembly of the surveillance device of FIG. 1.
Figure 4:
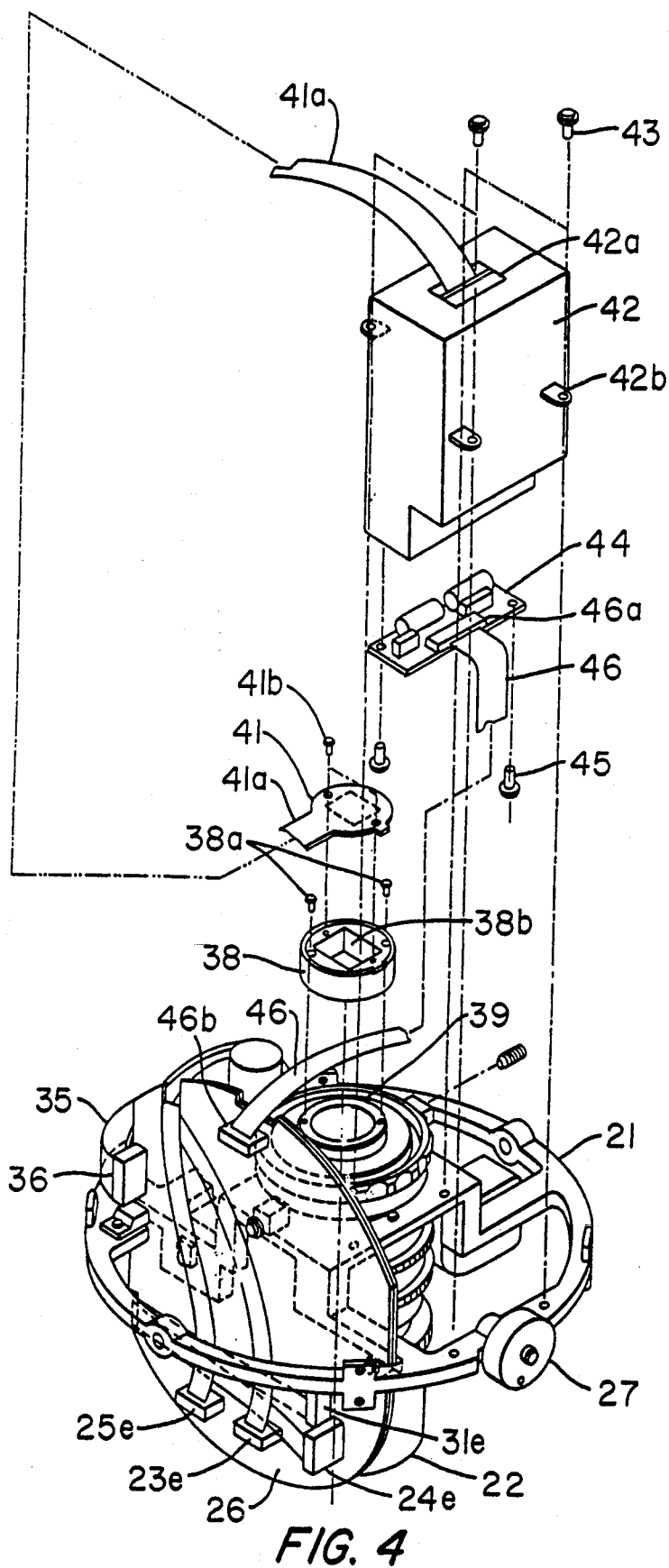
FIG. 4 show a view of the camera and lens assembly of the eyeball assembly of the surveillance device of FIG. 1 with the camera parts shown partially in exploded view.

FIGS. 2-4 show the camera and lens assembly 4 in greater detail. As shown, the mounting member 21 is used as the primary support structure for the components of the assembly. A central raised part 21a of the member 21 holds, via screws 21b, the barrel of a lens 22 which has rotatable sections 22a, 22b and 22c for controlling the usual zoom, iris and focus conditions of the lens. Associated zoom, iris and focus control motors 23, 24 and 25 are also connected via brackets 23a, 24a and 25a and screws 23b, 24b and 25b to appropriate areas of the mounting member 21 so that their respective gears 23c, 24c and 25c engage the lens sections 22a, 22b and 22c, respectively.

The motors 23-25 carry respective ribbon cables 23d, 24d and 25d and associated connectors 23e, 24e and 25e which connect the respective connectors to a camera and lens assembly PC board 26. The latter board is mounted to the member 21 via screws 26a and enables control and other signals to be coupled to and from the zoom, iris and focus motors for controlling and monitoring the corresponding conditions of the lens.

Also mounted to the mounting member 21 are couplings 27 and 28 which are provided for coupling the mounting member 21 to the carriage assembly 6. These couplings permit the mounting member 21 to be rotated about the x and y axes and, thereby, to impart this motion to the supported components, i.e., the camera and lens assembly components and the shroud 3 components, so that the entire eyeball assembly 2 is moved accordingly.

A first of these couplings 27 comprises a bearing 27a, a bearing housing 27b and a shaft 27c. The shaft 27c has a threaded end which is received in a threaded bore 21c located at one lateral end 21d of the mounting member 21. The other smooth end of the shaft 27c is press fit into the bearing 27a. The latter, in turn, is fit into the housing 27b so as to be rotatable about the x-axis.

The second coupling 28 is disposed at the opposite end 21e of the member 21 and also comprises a bearing 28a, a bearing housing 28b (formed by the surface of an aperture 29a in a sector gear 29) and a shaft 28c. The shaft 28c is also threaded at one end and this end is received in a threaded bore 21f at the end 21e of the member 21. The other smooth end of the shaft 28c is press fit into the bearing 28a which is also mounted in the bearing housing 28b so as to be rotatable about the x-axis.

In order to effect this x-axis rotation of the mounting member 21, a further tilt motor 31 is mounted to the member 21 via a bracket 31a and screws 31b. The motor 31 carries a gear 31c. The motor 31 also includes a ribbon cable 31d and connector 31e for connecting the motor to the PC board 26.

With the motor 31 appropriately driven by signals from the PC board 26, rotation of the gear 31c occurs, causing the gear to move about or around the gear face 29b of the sector gear 29. This, in turn, carries the mounting member 21 via the couplings 27 and 28 about the x-axis, to thereby effect desired x-axis rotation or tilting motion of the eyeball assembly 2 as discussed above.

Continuing with the description of the assembly 4, a spool retainer 34 is connected to an outer flat face 29c of the sector gear 29 via screws 33. A tab 29d on the face 29c engages a slot (not shown) on the retainer 34 to properly orient the retainer on the gear face.

Around the spool retainer 34 is wound a main ribbon cable 35 which is used to carry electrical signals between the assembly 4 and the carriage assembly 6. To this end, one end of the cable 35 has a connector 36 which is attached to the PC board 26, while other end of the cable 35 carries a slip ring interface or connector 37 which is attached to the carriage assembly 6 in a manner to be discussed in greater detail below.

The spool retainer 34 permits the ribbon cable 35 to be wound about the x or pivot axis and, thus, to wind and unwind as the mounting member 21 rotates. It also permits the cable 35 to pass from the eyeball assembly 2 in a plane parallel to the pivot axis. As a result, a substantial portion of the cable can be arranged in the eyeball assembly 2 compactly and so as to avoid the other components of the assembly when the eyeball is pivoted.

Furthermore, since only a small section of the cable need be outside the eyeball, the cable is less observable and less likely to entangle with the carriage assembly components. By winding the ribbon cable 35 about the pivot axis and passing it from the eyeball assembly parallel to this axis, bending of the cable which could lead to breaking of the cable is also avoided.

The camera portion of the camera and lens assembly 4 is best seen in FIG. 4. As shown, a camera adapter 38 is mounted via screws 38a to a camera/lens mounting 39 which will be discussed in greater detail hereinbelow. The camera adapter 38 carries an image pick-up unit 41 which is secured to the adapter 38 via screws 41b. A central aperture 38b in the adapter 38 permits images from the lens 22 to be received by the image pickup unit. A ribbon cable 41a is used to carry signals between the pick-up unit 41 and a camera body 42. The cable 41a is received in the camera body through an aperture 42a in the body.

The camera body is mounted to the mounting member 21 via tabs 42b and screws 43. The camera body 42 carries at its lower end via attachment screws 45 a camera PC board assembly 44. The camera PC board assembly 44 includes a ribbon cable 46 having a connector 46a connected to the board and a second connector 46b connected to the PC board 26. Video signals developed by the camera and control signals for the camera, are, therefore, processed and carried via these PC boards.

As above-indicated, eyeball assembly 2 comprised of the camera and lens assembly 4 and shroud 3 is carried by the carriage assembly 6 such that the assembly 2 is rotational about the x and y-axes. This is accomplished by utilizing in the carriage assembly 6 an eyeball support member 8 which is rotational about the y-axis and to which are fixedly mounted the couplings 27 and 28 of the assembly 4. In this way, rotation about the y-axis is imparted to the couplings 27 and 28 via the support member 8 causing like rotation of the mounting member 21 and, therefore, the entire eyeball assembly, i.e., assembly 4 and shroud 3. The couplings 27 and 28, furthermore, while fixed to the eyeball support member 8, still permit rotation of the eyeball assembly about the x-axis relative to the support member. Thus, the couplings and eyeball support member cooperate to permit the desired rotation of the eyeball assembly.

Figure 5A:
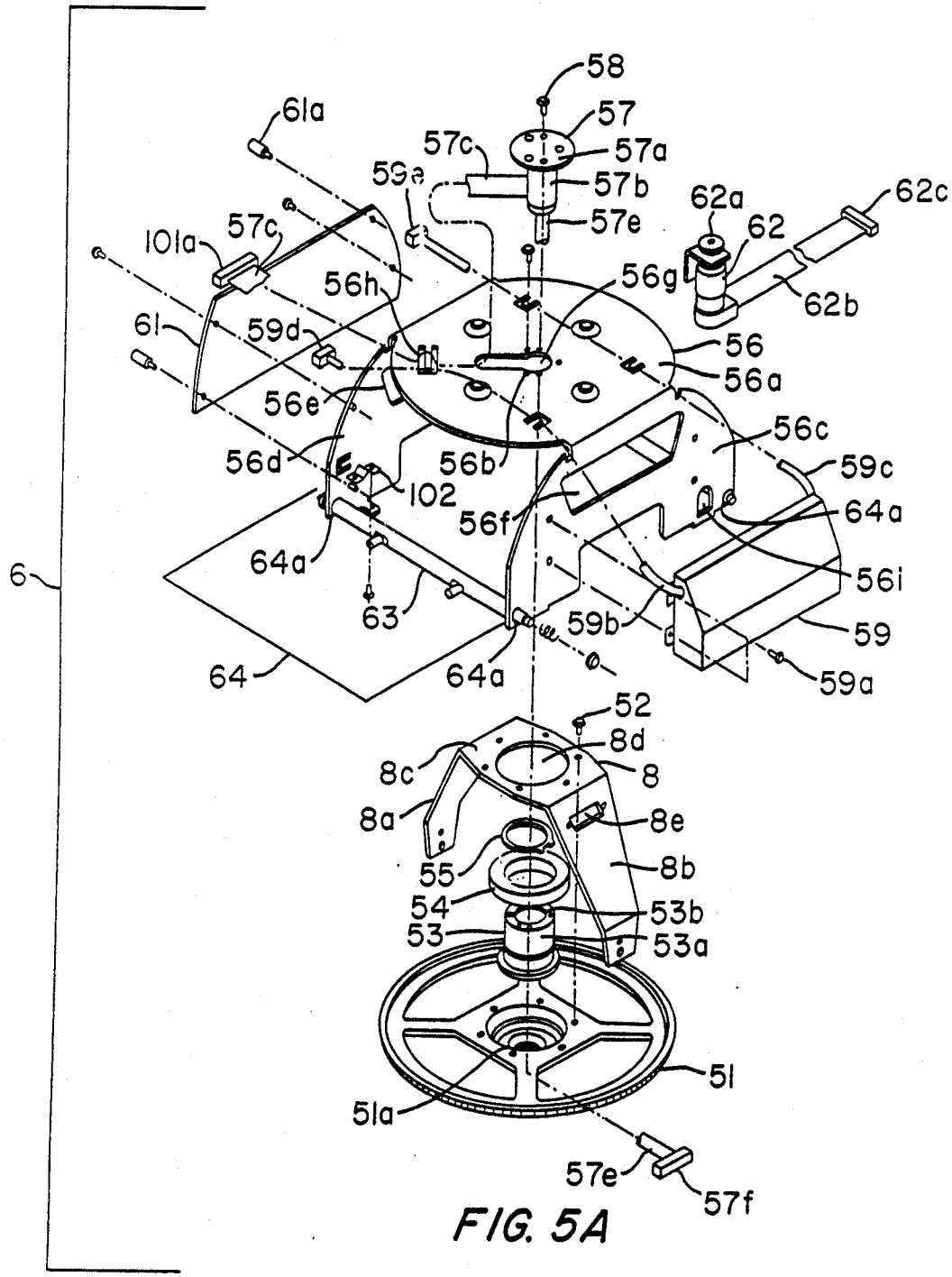
FIG. 5A shows an exploded view of the carriage assembly of the surveillance device of FIG. 1.
Figure 5B:
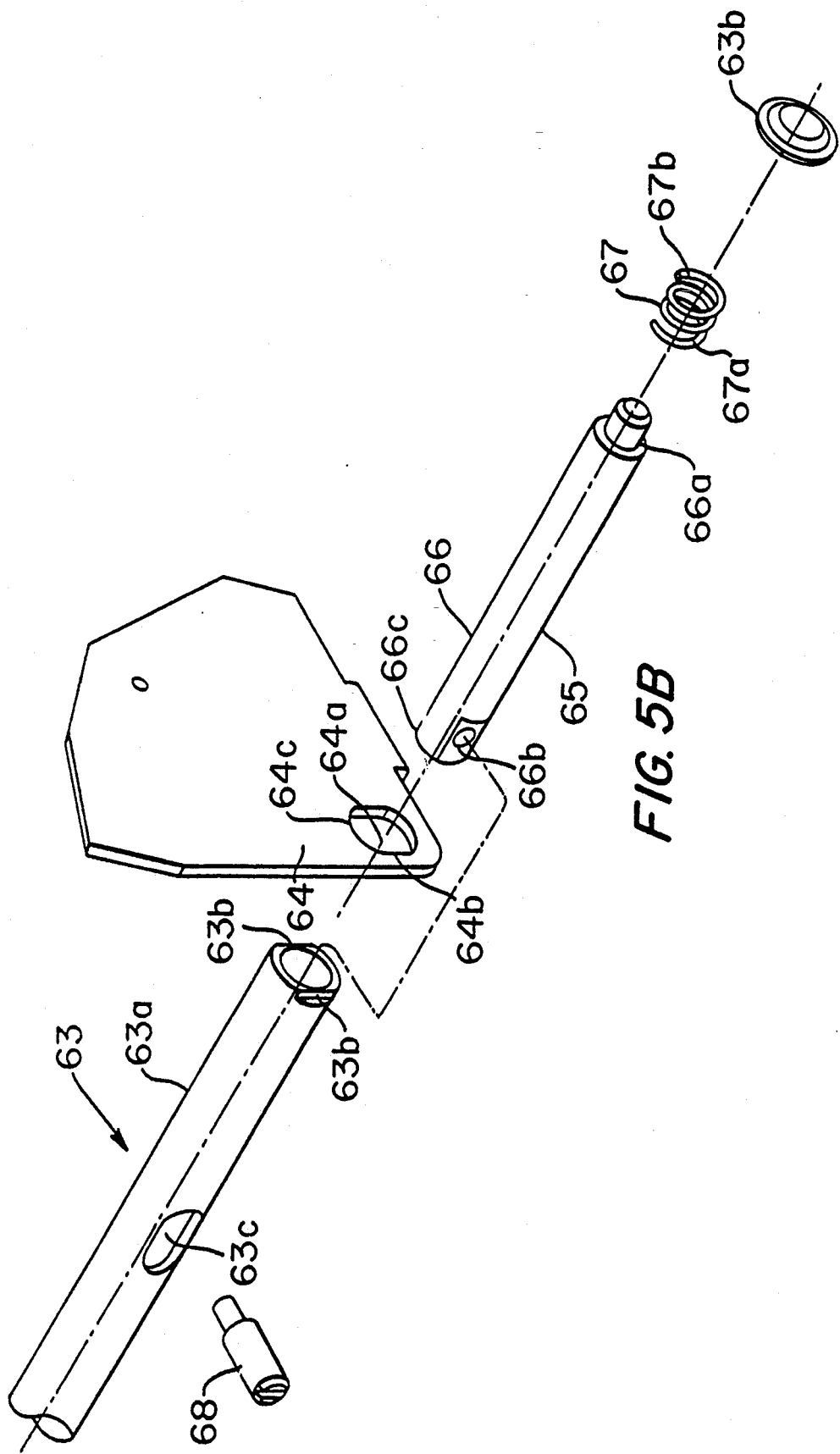
FIG. 5B shows in greater detail a part of the pivot and engagement assembly of the carriage assembly of FIG. 5A.
Figure 6:
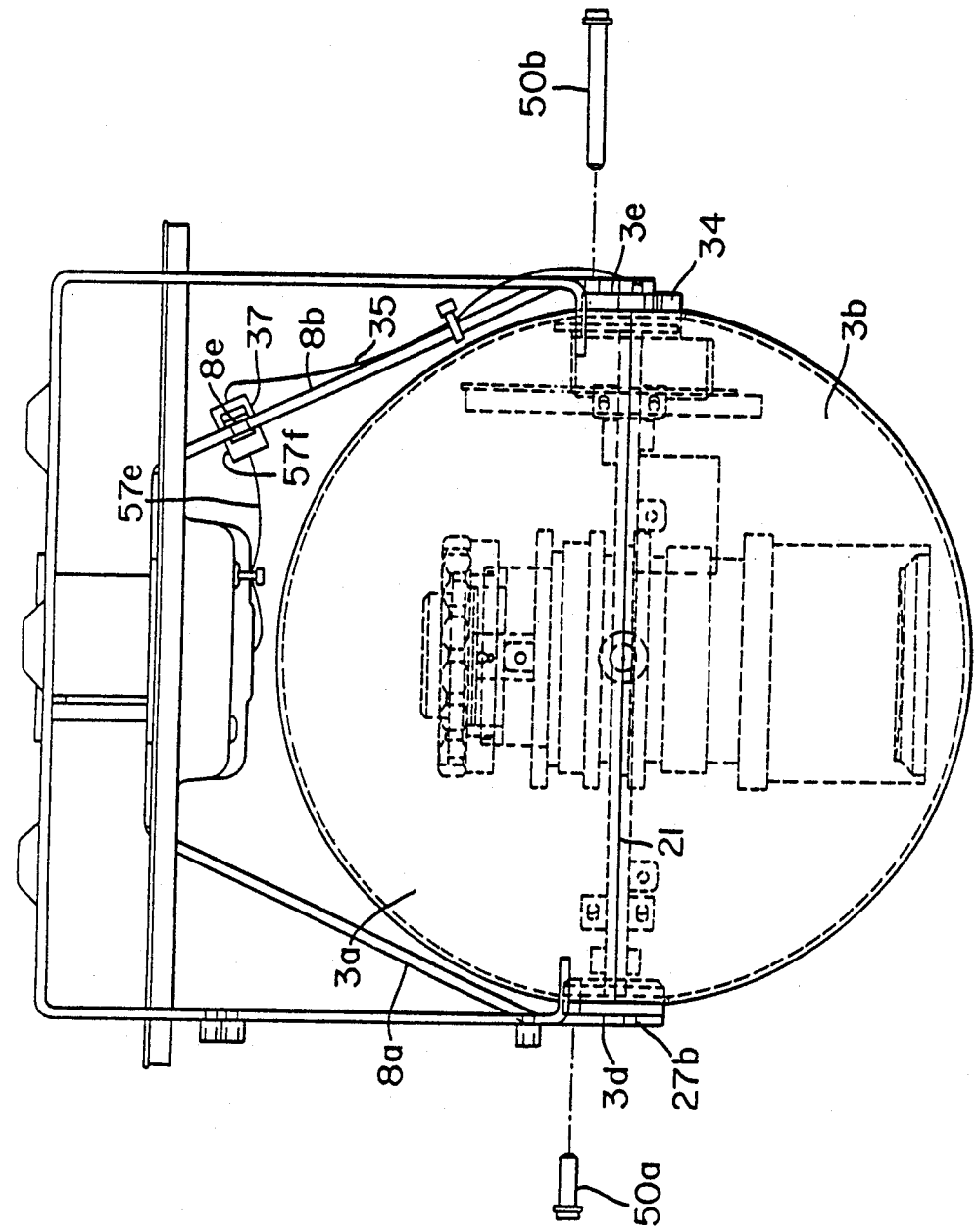
FIG. 6 shows an assembled view of the eyeball and carriage assemblies of the surveillance device of FIG. 1.

FIGS. 5A, 5B and 6 illustrate the carriage assembly 6 and the eyeball support member 8 in greater detail. As shown, the member 8 is in the form of a yoke having two arms 8a and 8b which extend from a flat connecting or middle section 8c. The arms 8a and 8b are fixedly connected to the couplings 27 and 28 (see FIG. 6) via screws 50a and 50b which attach the arms to the bearing housing 27b and the spool retainer 34 of the assembly 4. These screws pass through apertures 3d and 3e formed by mating slots 3f in the shells 3a and 3b of the shroud 3.

As can be appreciated, the fixed connection of the arms 8a and 8b to the couplings 27 and 34 enables the rotation of the member 8 about the y-axis to be carried, via the couplings, to the mounting member 21. It also allows the mounting member 21 to rotate about the x-axis relative to the member 8. The desired rotation of the eyeball assembly 2 about these axes can thus occur.

Rotation of the eyeball support member 8 about the y-axis is realized in the carriage assembly 6 by mounting the member 8, via screws 52, to a pan gear 51. The pan gear 51 includes a recessed seating area 51a in which a collar 53 is captured by a bearing 54 which is press fit into the seating area. A retaining ring 55 fits around the upper section 53a of the collar as an added means of preventing any upward movement of the bearing.

The upper section 53a of the collar 53 passes above the bearing 54 and through an aperture 8d in the connecting section 8c of the member 8. The end face 53b of the section 53a abuts and is connected to the bottom surface of a top bracket plate 56a of a carriage bracket 56. This connection is made via screws 58 which pass through holes 56b in the plate 56a and engage threaded holes in the end face 53b of the collar section 53a.

With the above configuration, the collar 53 and bearing 54 hold the pan gear 51 to the carriage bracket 56, while the bearing 54 permits the gear 51 to rotate about the y-axis relative to the bracket. The eyeball support member 8, which is fixed to the gear 51 is thus likewise held to the carriage bracket 56, while able to rotate with the gear 51 about the y-axis relative to the bracket.

To impart rotational movement to the pan gear 51, a pan motor 62 having a gear 62a is provided. The motor 62 is mounted to a side plate 56d of the carriage bracket 56 such that the gear 62a engages a portion of the pan gear 51 which passes through a slot 56e in the side plate 56d and a slot 56f in side plate 56c. The pan motor 62 has a ribbon cable 62b and an associated connector 62c. The latter is connected to a central processing unit (CPU) PC board 61. The PC board 61 receives signals for controlling the surveillance device 1 from a remote location and transmits signals to and receives signals from the other components of the device 1 including those of the eyeball assembly via the PC board 26.

The PC board 61 is mounted by screws 61a to the side plate 56d of the bracket 56. A second side plate 56c of the bracket 56 carries a power supply 59 which is mounted by screws 59a to the side plate. The side plate 56c also has a slot 56f for accommodating the pan gear 51. Cables 59b and 59c (shown in dotted line) have terminals 59d and 59e which connect to the PC board 61 for providing power to the components being supplied signals by the board.

The carriage bracket 56 also carries a slip ring 57. The slip ring 57 has a round flat mounting plate 57a which is secured to the top bracket plate 56a via the screws 58 used to mount the collar 53. The connecting assembly 57b of the slip ring extends below the plate 57a and passes through a slot 56g in the bracket plate 56a and down through the member 8, retainer ring 55, bearing 54, collar 53 and pan gear 51.

A first ribbon cable 57c from the assembly 57b is held in place in a first slot 56h of the top plate 56a, while a cable 57e has a connector 57f which is held in a slot 8e in the arm 8b of the eyeball support member 8 (see, FIG. 6). The connector 37 of the main ribbon cable 35 of the PC board 26 of the assembly 4, in turn, is held at the slot 8e for connection to the connector 57f of the slip ring. The end of ribbon cable 57c is connected to the PC board 61 by a connector 101a. The aforesaid connections of the slip ring 57 allow signals to be passed between the PC board 61 and the PC board 26 and the various components of the surveillance device.

As above-noted, the carriage assembly 6 is supported by the housing support section 7a of the housing 7. To allow easy and quick mounting of the assembly 6 to the housing support section 7a, the carriage bracket 56a of the carriage assembly is provided with two like pivot and engagement assemblies 63. These assemblies 63 are mounted on opposite sides of the carriage bracket and, in particular, between apertures 64a in opposing, lower lateral or outward ends 64 of the side plates 56c and 56d. Each assembly 63 (see, FIG. 5B) includes a sleeve 63a having opposing flat surfaces which seat in corresponding flat sides 64b of the apertures 64a to hold the sleeves in place.

Within each sleeve 63a are two-like pin asemblies 65. Each pin assembly includes a pin 66 having a pivot or engagement end 66a and a spring 67 surrounding the pin inward of this end. Each spring 67 engages at one end 67a the outer surface 64c of a bracket end 64 and at its other end 67b a retainer washer 63b which grips the corresponding pin 66 inward of the end 66a. This causes each pin 66 to be biased so that its pin end 66a is brought or forced outward of the associated sleeve 63a.

Outward movement of each pin 66 is limited by an actuator tab 68 which is held in an aperture 66b located at a second end 66c of the pin. Each tab 68 passes through an associated elongated slot 63c in the sleeve 63a, which slot interacts with the tab to provide the limited outward movement.

By applying a force on each tab 68 to move the tab toward the middle of the respective sleeve 63a, the bias force of the spring 67 is counteracted, thereby bringing the corresponding pin end 66a inward of the sleeve. As will be discussed hereinbelow, this action is used on the two tabs 68 of each pivot and engagement assembly 63 when mounting the carriage assembly 6 and its attached eyeball assembly 2 to the housing support section 7a.

Figure 7A:
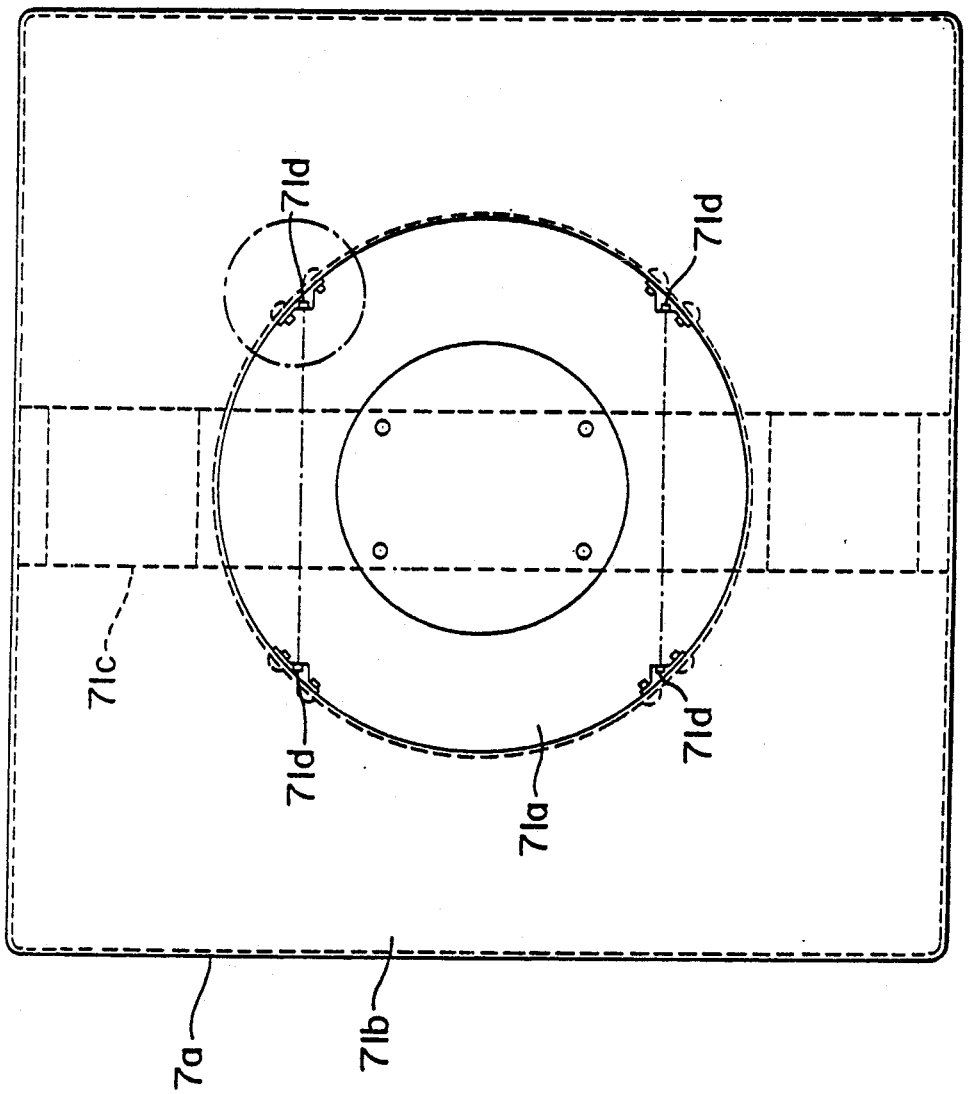
FIGS. 7A-7C show various views of the housing support section of the housing of the surveillance device of FIG. 1.
Figure 7B:
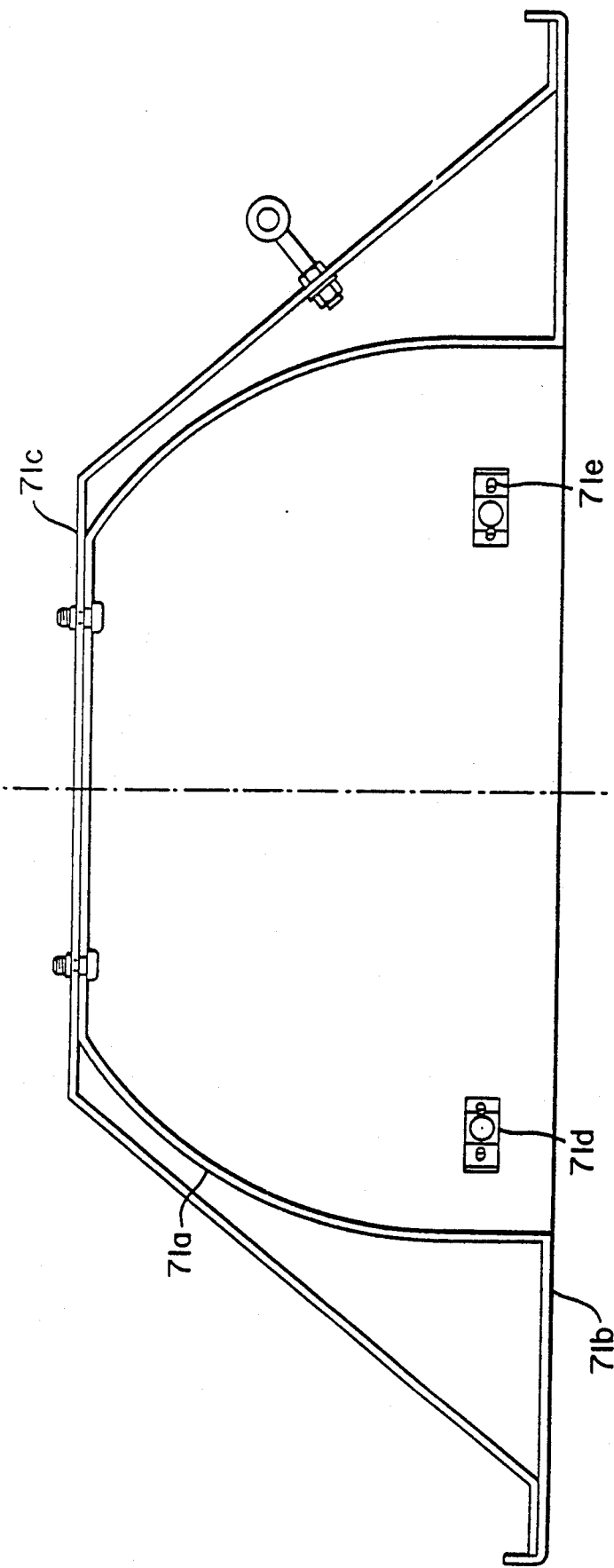
Figure 7C:
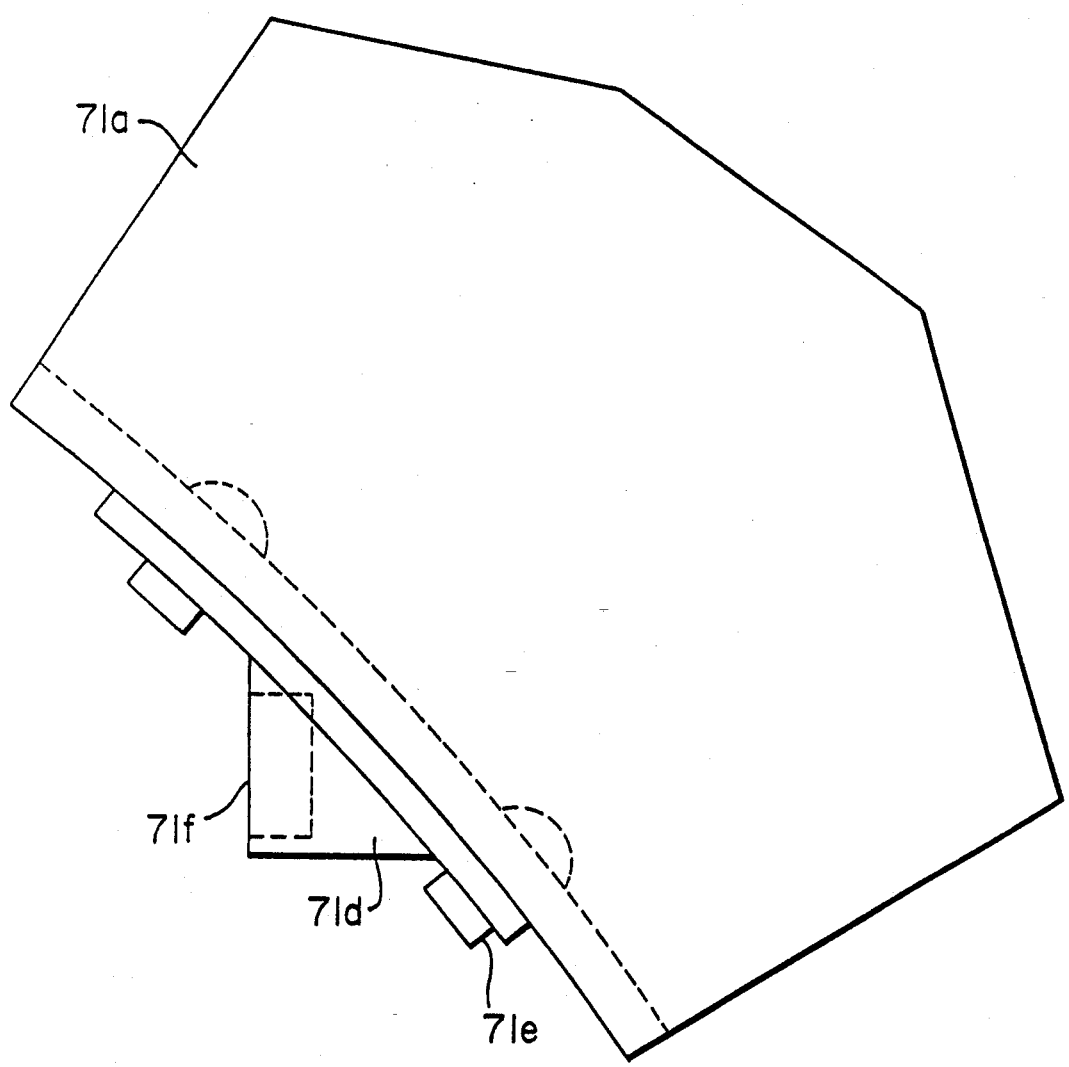

As shown in FIGS. 7A-7C, the aforesaid housing support section 7a comprises a dome portion 71a and a flange portion 71b. The flange portion 71b borders the lower peripheral edge of the dome portion and is shown as flat and square-shaped. A rectangular brace 71c is attached to and extends centrally over these housing portions to add rigidity to the structure.

The dome portion 71a is additionally provided with seating blocks 71d (see, FIG. 7C) which are held by rivets 71e to inner wall of the dome. The seating blocks 71d are arranged in opposing pairs and define first and second seating areas for the housing support section 7a. Each seating block 71d includes a slot 71f which forms its respective seating area.

The carriage assembly 6 and attached eyeball assembly 2 are affixed to the housing support section 7a by first engaging the actuator tabs 68 of one of the assemblies 63 to bring the associated pins 66 and their pin ends 66a toward each other. The carriage bracket 56 is then held and positioned so that the retracted pins of the assembly 63 are situated in facing relationship to the slots 71f of an opposing pair of seating blocks 71d.

The held actuator tabs 68 are then released, causing the pin ends 66a of the corresponding pins 66 to engage and seat in the seating slots 71f. This pivotably locks one of the engagement and pivot assemblies 63 to the housing support section 7a with the carriage assembly 6 and eyeball assembly 2 being suspended from this one pivot assembly.

The carriage bracket 56 is then pivoted via rotation of the pin ends 66a of the locked assembly 63 in their respective slots 71f. This pivoting continues until the other pivot and engagement assembly 63 is situated with its pins 66 in facing relationship to the slots 71f in the other pair of seating blocks 71d. The actuator tabs 68 of the second assembly 63, which tabs have been held during rotation to withdraw the corresponding pins 66, are now released. The pin ends 66a of these pins then engage and seat in the respective slots 71f. The second pivot and engagement assembly 63 is thus now also locked to the housing support section 7a.

With the locking of this second pivot and engagement assembly 63, the carriage assembly 6 becomes supported by the housing support section 7a in suspended fashion. The eyeball assembly 2 which is held by the carriage assembly 6 is then also supported in this fashion so as to be able to pan and tilt, as above-described, for viewing the location under surveillance.

Figure 8B:
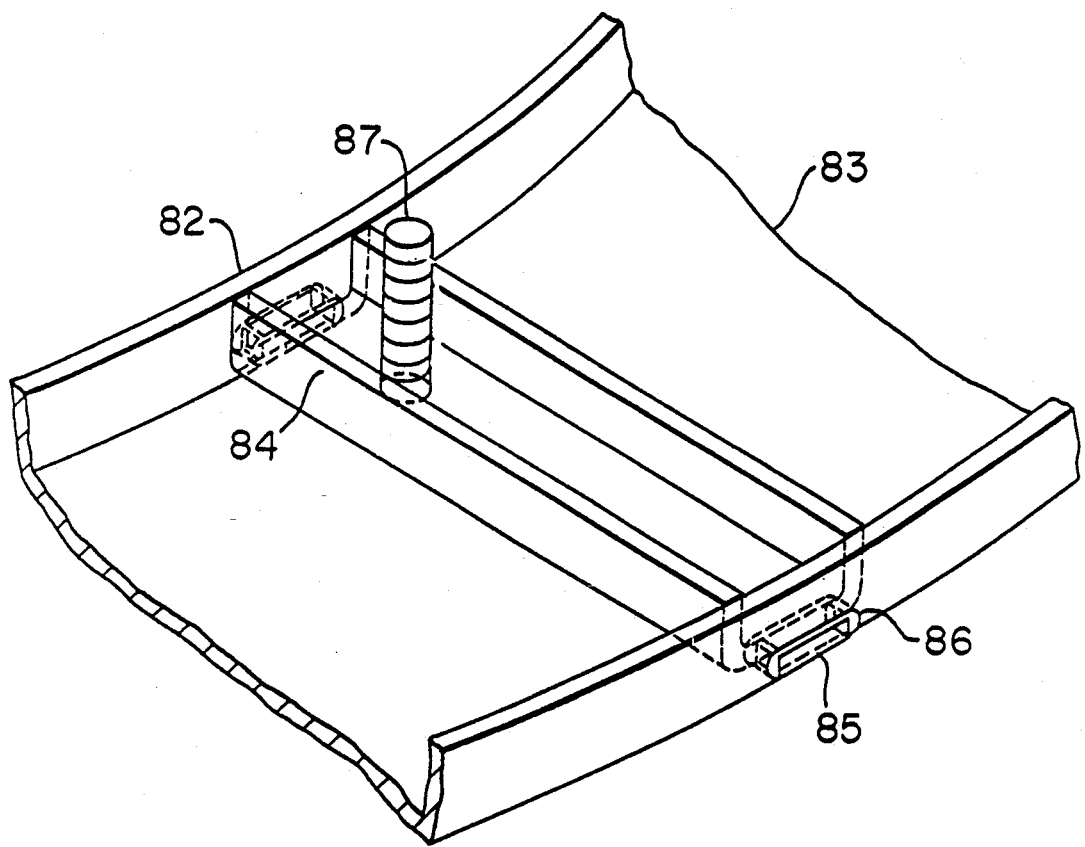

Once the carriage assembly 6 is mounted to the housing support section 7a, the housing cover section 7b is brought into abutting relationship with the housing support section to fully enclose the carriage and eyeball assemblies in the housing 7. FIGS. 8A and 8B show the housing cover section 7b in greater detail. As shown, it comprises a dome shaped portion 81a which is surrounding by a lip 81b. A decorative skirt 82 is connected to and extends outward of the lip 81b.

A channel 83 (see, FIG. 8B) in the skirt 82 supports clips 84 having tabs 85 which engage corresponding slots 86 in the channel walls. Each clip 84 carries an upwardly extending stud 87 which passes through a corresponding aperture 81c in the lip 81b. Fastener ball 88 connected to the studs 87 lock the skirt 82 and lip 81b together. A hinge element 89 is also affixed to the bar 87 of one of the clips 84 and becomes captured by the fastener ball 88.

During assembly, the housing cover section 7b is first attached to the carriage bracket 56 by inserting the hinge element 89 into an aperture 56 in the side plate 56c. Once the bracket 56 is mounted to the housing support section 7a, the cover 7b is then rotated via the hinge element 89 to bring the ball studs 88 into clips 102 carried on the inside walls of the bracket plates 56c and 56d. This results in total enclosure of the carriage assembly 6 and eyeball assembly 2 in the housing 7.

As above-indicated, the camera and lens assembly 4 is provided with a camera/lens mounting 39 for mounting the camera assembly, i.e., in the present case, the image pickup unit 41 supported on the adapter 38, to the lens 22. This mounting is adapted to permit movement of the mounting axially of the lens 22. As a result, the position of the mounting and, hence, the supported camera assembly, can be adjusted relative to the focal point of the lens, i.e., the back focus condition of the lens and camera can be adjusted.

Figure 9:
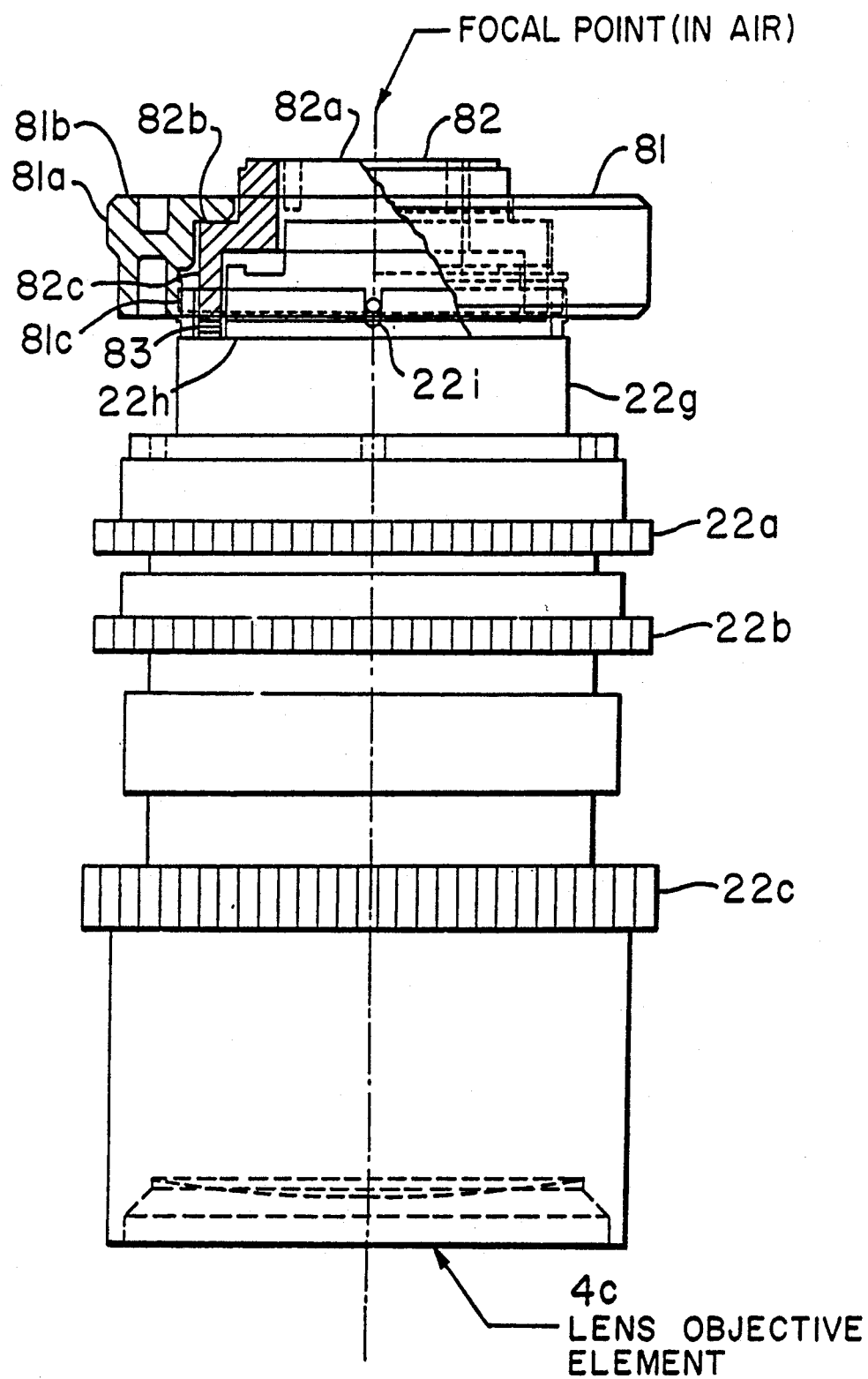
FIG. 9 shows a cross sectional view of the lens assembly depicting the camera/lens mounting of the camera and lens assembly of FIG. 2.

As shown in FIGS. 2 and 9, the camera/lens mounting 39 comprises a locking and adjusting ring or nut 81, a shouldered tubular member 82 and a resilient member in the form of a wavy metallic spring washer or annular member 83. The shouldered member 82 has an upper narrow tubular end 82a, a shoulder 82b and a wide lower tubular end 82c provided with a setting pin 82d. The member 83 comprises an annular body which undergoes undulations when proceeding around the circumference of the body. The body typically might have three or four undulations or waves at equal intervals about the circumference, i.e., at 90° intervals for four waves and at 120° intervals for three waves.

The locking and adjusting nut 81 has grips 81a on its outer surface and its inner surface has a top annular section 81b which is adapted to engage the shoulder 82b of the shouldered member 82. The inner surface also has a side wall section 81c which is threaded and adapted to engage corresponding threads on the lens end collar 22g to which the components of the camera/lens mounting 39 are to be affixed. The end collar 22g of the lens also has an annular slot 22h provided with a notch 22i in its end wall.

The camera/lens mounting 39 is attached to the collar 22g by first placing the wavy washer 83 into the slot 22h. The wide tubular end 82c of the shouldered member 82 is then situated in the slot over the washer with its setting pin 82d in the notch 22i of the slot. The locking ring 81 is then placed over the member 82 so that the narrow tubular end 82a of the member 82 protrudes above the ring. The ring is then turned so that the threads on its inner side wall section 81c engage the threads on the outer surface of the collar 22g. As the nut is rotated, the surface section 81b engages the shoulder 82b of the member 82 so that the shouldered member becomes locked to the lens. This locking is a positive locking due to the presence and force exerted on the shouldered member 82 by the wavy washer 83.

By rotating the nut 81 to different positions, the position of the shouldered member 82 can be adjusted, while still retaining a positive locking condition due to the wavy washer 83. This allows the shouldered member 82 and the supported adapter 38 carrying the image pickup unit 41 to be moved accurately and positively axially of the lens. Adjusting of the relative position of the image pickup 41 relative to the focal point of the lens, i.e., back-focus adjustment, is thus easily and readily achieved.

Figure 10:
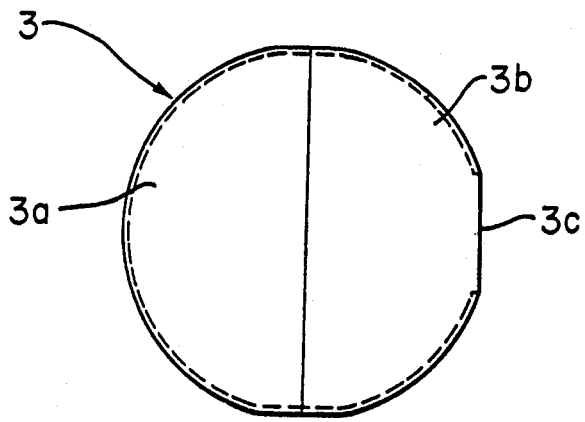
FIG. 10 shows a side view of the shroud of the camera and lens assembly of FIG. 1 without the aperture covering lens member of the shroud.

As discussed above, the camera and lens assembly 4 views outward of the spherical shroud through the view aperture 3c. In order to accommodate the viewing cone of the assembly 4 the aperture 3c has to be of appreciable lateral and/longitudinal extent and is preferably circular. As a result, the presence of the viewing aperture creates a flat spot area in the circular shape of the shroud when viewed from certain positions. This flat spot in the aperture area 3c can be seen in FIG. 10 which shows a side view of the shroud 3 with the shroud shells 3a and 3b joined.

The presence of the flat spot area makes the aperture 3c and, therefore, the viewing direction of the camera and lens assembly 4, detectable from certain viewing positions. In accordance with the principles of a further aspect of the invention, this effect is minimized by incorporating in the shroud 3 a lens member 91. In particular, the lens member 91 is such as to totally occupy the aperture 3c and is configured so that it substantially completes the spherical outer surface of the shroud shell 3b in the region or area of the aperture.

Figure 11:
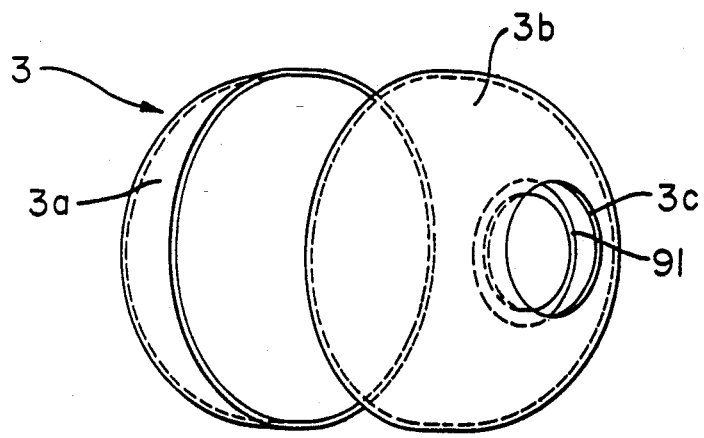
FIG. 11 shows the shroud of the camera and lens assembly of FIG. 1 with the aperture covering lens member in place and the shroud shells apart.
Figure 12:
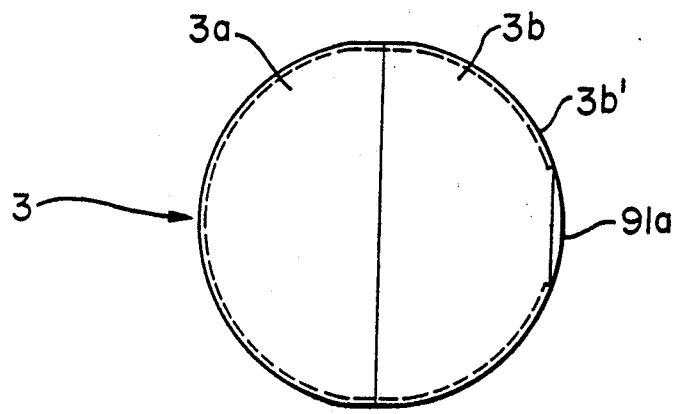
FIG. 12 shows a side-view of the shroud of the FIG. 11 with the shroud shells joined.

FIGS. 11 and 12 show the lens member 91 situated in the shroud shell 3b. As can be seen in FIG. 12, the outer surface 91a of the lens member 91 substantially follows and completes the outer spherical surface 3b' of the shroud shell 3b in the area of the aperture 3c. The shroud 3 thus appears spherical in this area and a flat spot is no longer observable.

Figure 13:
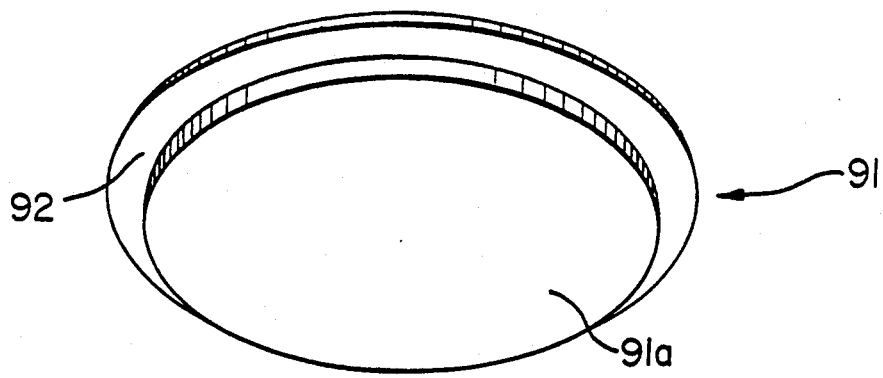
FIGS. 13-15 show various views of the aperture covering lens member of the shroud of FIGS. 1, 11 and 12.
Figure 14:
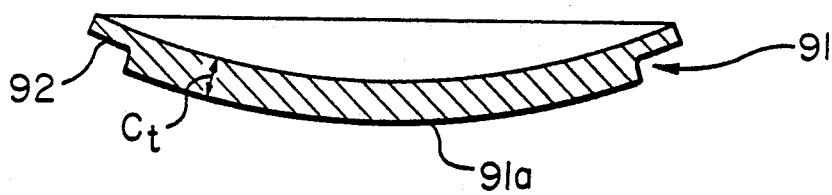
Figure 15:
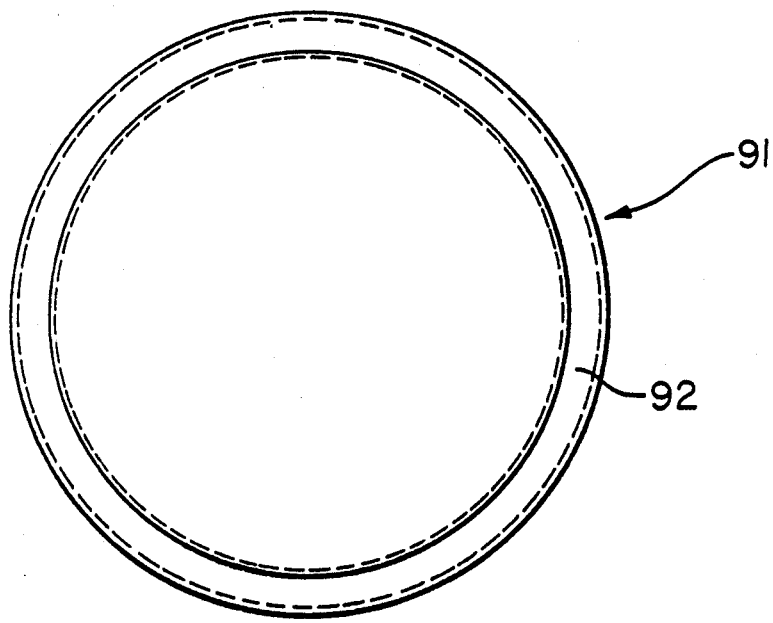

FIGS. 13-15 show the lens member 91 in greater detail. As shown, the lens member 91 is of circular, planar construction, i.e., of uniform thickness t, and has an outer surface 91a which is of sperical configuration. The spherical nature or contour of this surface, as above-described, is such that the surface completes the spherical surface 3b' of the shell 3b in the area of the aperture 3c. The exact contour of the surface 91a will, of course, depend upon the exact spherical surface of the shell and the size of the aperture.

As can be seen in FIGS. 14 and 15, the circular periphery of the lens member 91 is provided with a shoulder 92. The latter shoulder provides a seating area for seating the lens member against the inner surface of the shell 3b bordering the circular aperture 3c. An annular tape or other securing means 93 (see, FIG. 1) is then applied to the shoulder and adjacent shroud areas to fix the lens to the shroud.

In order to further blend the outer surfaces of lens 91 and shroud 3b so they appear as a single or complete spherical form, the lens surface can be made partially reflective to visible light as can the surface of shroud shells 3b and 3a. Additionally, the lens coloring can be made similar to that of the shell surfaces. One coloring effect is to make the surfaces of the shells opaque and the lens partially opaque. To accomplish this the lens can be fabricated from a partially opaque polycarbonate such as, for example, a CR 39 Polycarbonate, while the outer surfaces of the shells can be coated with a high gloss black polyester powder.

It should be noted that the lens 91 can also be fabricated as a clear member from a clear polycarbonate. Additionally, the lens need not be planar, but can be formed to have a thickness which varies to provide selective focusing of the incident light.

With the lens 91 in the shroud 3, it is extremely difficult to view the aperture 3c and, thus, to determine the viewing direction of the lens and camera assembly 4 of the eyeball assembly 2. As a result, the eyeball assembly 2 can be used in the surveillance device 1 without the light-transmissive bottom section 7b of the housing 7, if desired. Furthermore, the combination of the lens 91 and shroud 3, which shroud houses the camera and lens assembly 4 to form the eyeball assembly 2, has application in cases where the eyeball assembly is panned and-/or tilted other than as specifically described herein.

It should be noted that while the camera of the camera and lens assembly 4 has been illustrated above as having its image pickup 41 and camera body 42 as separate units, the image pickup and camera body could also be integrated into a single unit and this unit connected to the adapter 38. In such case, the camera body and its components may comprise an integrated circuit board or card which would be connected to the image pickup.

It should also be noted that the shells 3a, 3b of the shroud can be made of a metallic material or coated on their interior surfaces with a conductive material. This prevents electromagnetic emissions generated by the camera and lens assembly from escaping from the eyeball assembly and interfering with equipment in the adjacent areas.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention. Thus, for example, the camera/lens mounting 39 could be used with a camera and lens assembly which is fixed and not pivotable, as well as with cameras and lenses other than those disclosed herein. Also, the camera of a camera and lens assembly could be attached directly to the camera/lens mounting 39 without the use of an adapter 38. Such attachment could be to the end face of the tubular end 82a of the shoulder member 82 or to the outer wall of the tubular end 82a via threads provided on the wall.

What is claimed is:

1. A surveillance assembly comprising:
   an eyeball assembly including: a camera and lens assembly having a viewing axis and a viewing cone; a spherical shroud substantially totally surrounding said camera and lens assembly and having a light transmissive area comprising a circular aperture aligned with the viewing axis of said camera and lens assembly and sufficient to pass said viewing cone, whereby said camera and lens assembly can view outward of said shroud; and a lens member affixed to said shroud so as to occupy said aperture, said lens member having over the area of said aperture an outer spherical surface configured so as to follow and substantially complete the spherical surface of said shroud so that said outer spherical surface of said lens member and said spherical surface of said shroud appear as a substantially complete sphere.

2. A surveillance assembly in accordance with claim 1 wherein:
   the periphery of said lens is circular.

3. A surveillance assembly in accordance with claim 2 wherein:
   the periphery of said lens has a shoulder;
   and said lens is situated in said shroud with said shoulder abutting the inner surface of said shroud bordering said aperture.

4. A surveillance assembly in accordance with claim 3 further comprising:
   an annular securing member overlapping the periphery of said lens member and the inner surface of said shroud bordering said periphery for securing the lens member to said shroud.

5. A surveillance assembly in accordance with claim 1 wherein:
   the outer surface of said shroud is reflective to light;
   and the outer surface of said lens is partially reflective to light.

6. A surveillance assembly in accordance with claim 5 wherein:
   said outer surface of said shroud is opaque;
   and said lens member is partially opaque.

7. A surveillance assembly in accordance with claim 1 wherein:
   said outer surface of said shroud is a first color;
   and the coloring of said lens includes said first color.

8. A surveillance assembly in accordance with claim 1 wherein:
   said shroud comprises joined part-spherical shells.

9. A surveillance assembly in accordance with claim 1 wherein:
   said lens member comprises a planar lens.

10. A surveillance assembly in accordance with claim 1 wherein:
    said lens member comprises a non-planar lens.

11. A surveillance assembly in accordance with claim 1 wherein:
    said eyeball assembly is further adapted to be rotatable about first and second axes so as to enable rotation of said camera and lens assembly and said shroud about said first and second axes, while said viewing axis and said viewing cone of said camera and lens assembly remain aligned with said light transmissive area of said shroud.

12. A surveillance assembly in accordance with claim 11 further comprising:
    a housing for housing said eyeball assembly so as to permit said rotation of said eyeball assembly about said first and second axes and including a light transmissive section for passing said viewing cone of said camera and lens assembly during rotation of said eyeball assembly.

13. A surveillance assembly in accordance with claim 11 wherein:
    said eyeball assembly further includes first means adjacent spaced peripheral points of said eyeball assembly and adapted to be connected to a part of a carriage assembly for carrying said eyeball assembly for rotating said eyeball assembly about said first axis, said first means being further adapted to allow said eyeball assembly to rotate about said second axis relative to said part of said carriage assembly.

* * * * *